United States Patent Office 3,456,031
Patented July 15, 1969

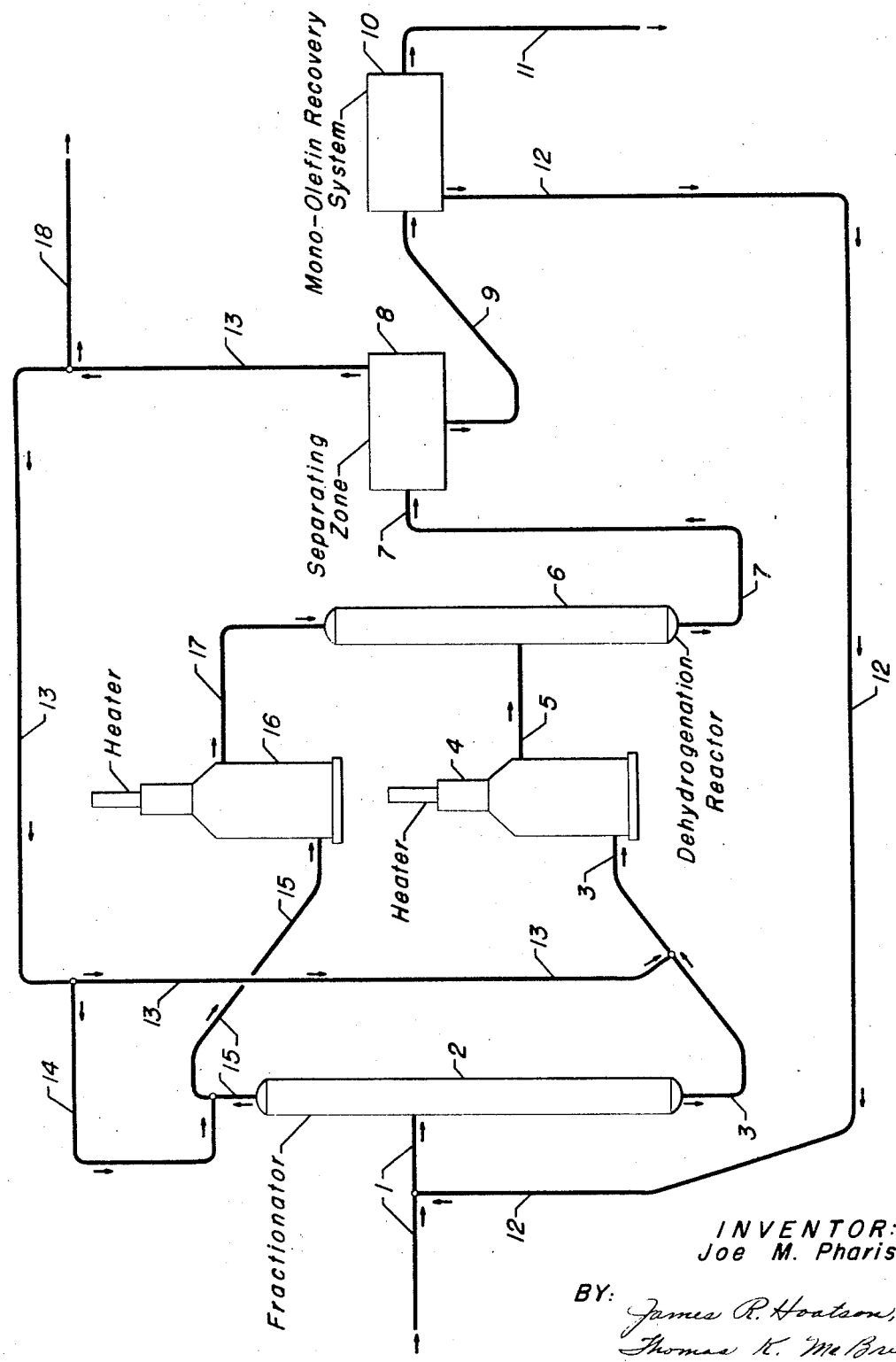

3,456,031
SELECTIVE CATALYTIC DEHYDROGENATION OF A MIXTURE OF NORMAL PARAFFIN HYDROCARBONS
Joe M. Pharis, Downers Grove, Ill., assignor to Universal Oil Products Company, Des Plaines, Ill., a corporation of Delaware
Filed July 5, 1968, Ser. No. 742,741
Int. Cl. C07c 5/18, 11/02; C10g 11/26
U.S. Cl. 260—683.3                                    9 Claims

ABSTRACT OF THE DISCLOSURE

A mixture of at least 4 normal paraffin homologs is selectively dehydrogenated to produce normal mono-olefin analogs of the normal paraffins by fractionating the mixture into a plurality of fractions of different boiling point range, each of which contains substantial amounts of at least one normal paraffin homolog; introducing the lowest boiling fraction produced by the fractionation step and hydrogen into one end of a dehydrogenation reactor containing a fixed bed of a dehydrogenation catalyst; introducing each of the remainder of the fractions produced in the fractionation step and hydrogen into the dehydrogenation reactor at a point, along the axis of flow through the reaction, which is selected for each fraction to produce a severity level for the fraction that is inversely related to the average boiling point thereof; maintaining the dehydrogenation reactor at conditions sufficient to convert normal paraffins to normal mono-olefins and withdrawing from the second end of the dehydrogenation reactor an effluent stream containing normal mono-olefins having the same number of carbon atoms as the normal paraffin homologs, hydrogen and unreacted normal paraffin homologs. Key feature of the resulting process is its high selectivity for production of normal mono-olefins as compared with the selectivity achieved, at the same conversion level, when the entire hydrocarbon stream is charged directly to the dehydrogenation reactor.

---

The subject of the present invention is an improved process for the selective dehydrogenation of a mixture of at least 4 normal paraffin homologs to produce normal mono-olefin analogs thereof. More precisely, the present invention involves a method of improving the selectivity and stability characteristics of a catalyst dehydrogenation process which utilizes a non-acid, alumina-support, platinum metal-containing catalyst to transform a mixture of normal paraffin hydrocarbons to the corresponding normal mono-olefins with minimum production of side products and minimum deactivation of the catalyst utilized.

The concept of the present invention developed from my investigations into the problem associated with the charging of a wide boiling feed stream to a catalytic dehydrogenation process which has been specifically designed to have a high selectivity and stability for the production of long-chain normal mono-olefins. The principal problem encountered essentially involves degradation of these selectivity and stability parameters relative to the value experienced with a feed stream boiling in a narrow range. Quite unexpectedly, I have now found a method that allows the recapture of these high selectivity and stability features of this process when a wide boiling range feed stream is charged thereto. Basically, my method involves fractionating the wide boiling feed stream into a plurality of fractions which are then introduced into a dehydrogenation reactor containing the dehydrogenation catalyst at multiple points, which points are selected for each fraction so that the severity level experienced by that fraction varies inversely with the average boiling point of the fraction. In other words, my solution to this problem involves the selection of contact times of the reactants with the catalyst so that the severity level experienced by each fraction is proportioned to the average boiling point thereof. This procedure minimizes the production of undesired products from the dehydrogenation reaction and controls the production of hydrocarbonaceous deposit precursors which can deactivate the catalyst.

Although extensive work has been done in the general area of production of mono-olefins from paraffins, the chief effort in the past has been primarily concentrated on lower molecular weight paraffins (i.e. paraffins having 2 to 6 carbon atoms). This concentration of effort was basically caused by the ready availability of large quantities of these paraffins coupled with the building-block nature of the product olefins that could be made therefrom. Recently, attention within the chemical and petroleum industries has been focused upon the problem of acquiring long-chain, normal mono-olefins. In particular, a substantial demand has been established for normal mono-olefins having 6 to 20 carbon atoms. As might be expected, this demand is primarily a consequence of the growing commercial importance of the products that can be synthesized from these normal mono-olefins. For example, derivatives of normal mono-olefins have become of substantial importance to the detergent industry because these normal mono-olefins can be used to alkylate an alkylatable aromatic, such as benzene, and the resultant arylalkane can be transformed into a wide variety of biodegradable detergents such as the alkylaryl sulfonate (anionic) type of detergent which is most widely used for household, commercial and industrial purposes. Another type of detergent produced from these arylakanes is alkylaryl-polyoxyalkylated amines. Still another large class of the detergents produced from the normal mono-olefins are the oxyalkylated phenol derivatives in which the alkylphenol base is prepared by the alkylation of phenol. Other uses of these long-chain mono-olefins include: direct sulfation to form biodegradable alkyl sulfates of the type R—OSO$_3$Na; direct sulfonation with sodium bisulfite to make biodegradable sulfonates of the type R—SO$_3$Na; hydration to alcohols which are used to produce plasticizers or synthetic lube oils; hydration to produce alcohols followed by dehydrogenation to form ketones which can be reduced in the manufacture of secondary amines by reductive alkylation; ester formation by direct reaction with acids in the presence of catalysts such as BF$_3$-etherate; and the preparation of di-long-chain alkylbenzenes of which the heavy metal sulfonates are prime lube oil detergents.

Responsive to this demand for long-chain, normal mono-olefins, the art has developed a number of alternative methods to produce them in commercial quantities. One method, which recently has attracted a great deal of attention, involves the selective dehydrogenation of these long-chain, normal paraffin hydrocarbons by contacting them and hydrogen with a non-acid, alumina-support, platinum metal-containing catalyst. The principal feature of this method that is chiefly responsible for its commerical popularity relates to the ability of this catalyst system to perform the desired conversion to normal mono-olefins with minimum interference from side reactions such as skeletal isomerization, dehydrocyclization, cracking, polymerization, secondary dehydrogenation, etc. In concrete terms, this feature means the ability to sustain relatively high levels of conversion at high selectivity for extended periods of time. However, I have now determined that this high selectivity feature of this preferred method is substantially reduced when a wide-boiling feed stream is charged thereto. More specifically, the results obtained when charging a wide boiling feed stream to this preferred process, relative to those that are obtained with a narrow boiling feed stream at a comparable weight percent conversion level, indicate a substantial loss of over-all selectivity in the former case with an attendant increase in side-products. The term "wide-boiling feed stream" is used herein to refer to a feed stream containing at least 4 normal paraffin homologs each of which has at least 6 carbon atoms, and, conversely, a "narrow boiling feed stream" contains at the most 2 adjacent normal paraffin homologs.

The reasons why it is desired to charge a wide boiling feed stream to this preferred dehydrogenation method are determined largely by the nature of the final products that are to be made from the resulting normal mono-olefins. A good example is given by the situation where an arylalkane detergent intermediate is to be produced from these long-chain normal mono-olefins. In this case, the preferred procedure for adjusting the solubility, detergency, and the like properties of the final detergent, involves using a normal mono-olefin source for the linear alkyl group on this intermediate, which source is wide enough in boiling point to incorporate at least 4 mono-olefin homologs. Another reason for charging a wide boiling feed stream involves the ready availability of this type of stream and its relatively low cost. Accordingly, there is a substantial need for a selective normal paraffin dehydrogenation process that can conveniently handle a wide-boiling range feed stream with high selectivity, and I have now found such a process.

Without the intention of being limited by this explanation, I have determined that the observed degradation in selectivity and stability which attends the charging of a wide boiling feed stream to this preferred method, involves two principal considerations: one being the fact that the higher molecular weight normal paraffins dehydrogenate more readily than the lower homologs, and the second being a rather sharp decrease in selectivity, calculated on an individual homolog basis, that accompanies operation at conversion levels, based on each individual homolog, above about 12 wt. percent. Taken together, these two factors cause the observed selectivity degradation when a wide boiling feed stream is charged to the preferred catalyst system at conditions designed to achieve an over-all conversion level of about 10 to 20 wt. percent, based on the feed stream, because at these conditions the higher homologs dehydrogenate much more readily and produce a conversion level, calculated on an individual homolog basis, that is above the level at which the selectivity for the corresponding normal mono-olefins remains high. For example, for a $C_{11}$ to $C_{14}$ charge stock at conditions sufficient for an over-all conversion of about 10 to 11 wt. percent, the $C_{13}$ and $C_{14}$ homologs undergo about 15 wt. percent conversion whereas the $C_{11}$ and $C_{12}$ homologs undergo about a 7 to 8 wt. percent conversion; and, for these $C_{13}$ and $C_{14}$ homologs, at this conversion level there is a marked decrease in selectivity for the corresponding $C_{13}$ and $C_{14}$ mono-olefins, leading to a sharp decrease in over-all selectivity and to process instability.

Regardless of theoretical considerations, I have observed that a wide-boiling, normal paraffin-containing feed stream can be dehydrogenated at higher over-all selectivity for long-chain normal mono-olefins when the feed stream is fractionated into a plurality of fractions and each of these fractions are dehydrogenated at severity levels which are inversely related to the average carbon number of the normal paraffins contained therein. In addition, I have determined that this method materially reduces the rate of catalyst deactivation since it substantially decreases the rate of formation of side products, such as dienes, trienes, cyclic compounds, etc., which are known precursors of carbonaceous deposits on the catalyst. Moreover, I have found that a convenient means for varying the severity level in the dehydrogenation step involves the use of a dehydrogenation reactor having multiple feed input points spaced along its axis of flow.

It is, therefore, an object of the present invention to provide a process for selectively dehydrogenating a wide-boiling, normal paraffin-containing feed stream at relatively high over-all selectivity and stability. Another object is to perform this process using only one dehydrogenation reactor.

In one embodiment, the present invention relates to a process for selectively dehydrogenating a hydrocarbon stream containing at least 4 normal paraffin homologs each of which has at least 6 carbon atoms. This process uses a single dehydrogenation reactor containing a dehydrogenation catalyst and having a first end and a second end. The process comprises the steps of: (a) fractionating the hydrocarbon stream into a plurality of fractions of different boiling point range, each of which fractions contains substantial amounts of at least one normal paraffin homolog; (b) introducing the lowest boiling fraction produced by step (a) and hydrogen into the first end of the dehydrogenation reactor; (c) introducing each of the remainder of the fractions produced in step (a) and hydrogen into the dehydrogenation reactor at a point between said first end and said second end selected for each fraction to produce a severity level, for the fraction, that is inversely related to the average boiling point thereof; (d) maintaining said dehydrogenation reactor at conditions sufficient to convert normal paraffins to normal mono-olefins; and (e) withdrawing from said second end of said dehydrogenation reactor an effluent stream containing normal mono-olefins having the same number of carbon atoms as said normal paraffin homologs, hydrogen and unreacted normal paraffin homologs.

In a second embodiment, the invention involves the process as outlined above wherein the dehydrogenation catalyst comprises a platinum group component and an alkali component combined with an alumina carrier material.

A preferred embodiment of the present invention involves the process as outlined in the first embodiment above wherein the dehydrogenation catalyst comprises an alumina carrier material having combined therewith a platinum group component, an alkali component, and a component selected from the group consisting of arsenic, antimony, bismuth, sulfur, selenium, tellurium, and compounds thereof.

Other embodiments and objects of the present invention encompass further details about: suitable catalysts for use in the dehydrogenation step thereof, the feed stream that can be charged thereto, the process conditions used in each step thereof, the mechanics of the product recovery step associated therewith, preferred procedures for recycling unreacted normal paraffins recovered therefrom, etc. These embodiments and objects will become evident from the following detailed discussion of each of these elements of the present invention.

The hydrocarbon stream that is charged to the process of the present invention contains at least 4 normal paraffin homologs all of which have at least 6 carbon atoms. An especially preferred feed stream contains long-chain normal paraffins having about 9 to about 20 carbon atoms. In one embodiment wherein the resulting normal mono-olefins are transformed into arylalkanes, useful as an intermediate in the manufacture of detergents, a hydrocarbon stream containing normal paraffins of about 10 to about 15 carbon atoms is quite commonly charged since these produce intermediates which can be utilized to make detergents having superior biodegradability and detergency. For example, a hydrocarbon stream containing 4 or 5 homologs such as $C_{10}$ to $C_{13}$, a $C_{11}$ to $C_{14}$, or a $C_{11}$ to $C_{15}$ fraction provides an excellent charge stock when detergent alkylate is to be produced. It is generally preferred that the amount of non-normal hydrocarbons present in this feed stream be kept at low levels. Thus, it is preferred that the stream contain greater than 90 wt. percent normal paraffins, with best results achieved at purities in the range of 96 to 98 wt. percent or more.

It is within the scope of the present invention to pretreat the hydrocarbon feed stream via a suitable means for removing aromatic and cyclic compounds therefrom; for example, by contacting the feed stream with a solution of sulfuric acid, followed by a suitable neutralization operation. In a preferred embodiment, the feed stream is obtained by subjecting a hydrocarbon distillate containing normal paraffins in admixture with non-normal hydrocarbons within the desired boiling range to a separation operation employing one or more beds of molecular sieves which, as is well-known, have the capability to produce extract streams having a very high concentration of normal components. A preferred separation system for accomplishing the production of a suitable feed stream is adequately described in U.S. Patent No. 3,310,486 and reference may be had thereto for the details about the mechanics of this type of separation. For example, a preferred procedure would involve charging a kerosine fraction boiling within the range of about 300° F. to about 500° F. to the separation system of the type described in U.S. Patent No. 3,310,486 and recovering therefrom a hydrocarbon stream containing a mixture of normal paraffins in the $C_{10}$ to $C_{15}$ range. Typically, this last procedure can be performed so that the extract stream produced therefrom contains 98 wt. percent or more of normal paraffin hydrocarbons boiling within the range of 300° F. to about 500° F. It is, of course, understood that the above merely indicates a preferred source of the feed streams for the present invention; and any other suitable source of feed streams of the kind described may be used if desired.

Although the present invention can be used with any normal paraffin dehydrogenation catalyst known to the art, the preferred dehydrogenation catalyst contains an alumina component, a platinum group component, and an alkali component. It is to be noted that the phrase "alkali component" is intended to include within its scope both alkali metals and alkaline earth metals and compounds thereof. Although it is not essential, it is generally preferred that the catalyst used in the dehydrogenation step contain an additional component selected from the group consisting of arsenic, antimony, bismuth, sulfur, selenium, tellurium, and compounds thereof.

The alumina carrier material generally has an apparent bulk density less than about 0.5 gm./cc. with a lower limit of about 0.15 gm./cc. The surface area characteristics are such that the average pore diameter is about 20 to about 300 angstroms; the pore volume is about 0.10 to about 1.0 ml./gm.; and the surface area is about 100 to about 700 m.²/gm. It may be manufactured by any suitable method including the well-known alumina sphere manufacturing procedure detailed in U.S. Patent No. 2,620,314. Suitable alumina materials are the crystalline aluminas known as gamma-; eta-; and theta- alumina, with gamma-alumina giving best results.

The alkali component is selected from both alkali metals—cesium, rubidium, potassium, sodium, and lithium and the alkaline earth metals—calcium, magnesium, strontium, and barium. The preferred component is lithium. Generally, the alkali component is present in an amount, based on the elemental metal, of less than 5 wt. percent of the total catalyst with a value in the range of about 0.01 to about 1.5 wt. percent generally being preferred. In addition, the alkali component may be combined with the alumina carrier material in any suitable manner with impregnation by aqueous solutions being especially preferred. For example, an aqueous solution of lithium nitrate provides an excellent impregnation solution.

The platinum group component is selected from the group of palladium, iridium, ruthenium, rhodium, osmium, and platinum, with platinum giving best results. This component is used in a concentration, calculated on an elemental basis, of 0.05 to about 5.0 wt. percent of the catalyst. This component may be used in any suitable form particularly including the oxides, sulfides, and other suitable compounds with best results generally obtained when this component is predominantly in an elemental metallic state. This component may be combined with the alumina carrier material in any suitable manner with impregnation by water soluble compounds such as chloroplatinic acid being especially preferred.

The preferred fourth component is selected from the group consisting of arsenic, antimony, bismuth, sulfur, selenium, tellurium, and compounds thereof. Arsenic is particularly preferred. This component typically is used with good results in an amount of about 0.01% to about 1.0% by weight of the final composite. Moreover, this component is typically present in an atomic ratio to the platinum group component in about 0.1 to about 0.8 with intermediate concentrations being preferably employed such that the atomic ratio is about 0.2 to about 0.5. This component can be combined with the alumina carrier material in any suitable manner with a particularly preferred method being impregnation by a water soluble solution of a compound such as arsenic pentoxide, etc.

This catalyst is typically subjected to one or more conventional drying and calcination treatments during its production. Additional details as to suitable dehydrogenation catalysts for use in the present invention, and methods of preparation, are given in the teachings of U.S. Patents Nos. 2,930,763, 3,291,755, and 3,310,599. Moreover, it is a good practice to presulfide the catalyst by any of the available techniques prior to its use in the present invention.

According to the present invention, the first step of the process is a separation step wherein the feed stream is separated into a plurality of fractions. This separation step may be performed in one or more conventional fractionation means, details of which are well-known to those skilled in the art and need not be repeated here. The essential point is that the fractionation must be made into a plurality of fractions of different boiling point range each of which fractions contains a substantial amount of at least one normal paraffin homolog. In the preferred case, each of the fractions produced in this step contain substantial amounts of no more than 2 adjacent normal paraffin homologs, although an improvement in over-all selectivity and stability is obtained by any division of the hydrocarbon feed stream such as for example, into a higher boiling fraction and a lower boiling fraction. For example, for a $C_{11}$ to $C_{14}$ boiling range feed stock, the fractionation step would typically produce a first fraction boiling substantially in this $C_{11}$ to $C_{12}$ range, and a second fraction boiling in the $C_{13}$ to $C_{14}$ range.

The second step of the process then involves dehydrogenating each of the fractions obtained from the first step. As indicated above, the step involves contacting the fractions produced in the first step and hydrogen with the preferred catalyst at dehydrogenation conditions sufficient to produce normal mono-olefins corresponding in carbon number to the normal paraffins contained in each of these fractions.

An essential feature of the present invention is the use of a single dehydrogenation reactor in this dehydrogenation steps. This dehydrogenation reactor has a first end and a second end with an axis of flow from the first end to the second end and typically contains a fixed bed of a dehydrogenation catalyst of the type described in detail hereinbefore. Although the dehydrogenation catalyst may be utilized in particles of any suitable shape, it is generally preferred to use substantially spherical particles having an average diameter of about 1/32 to about 1/2 inch or more, with particles having a diameter of about 1/16 inch typically being preferred. The dehydrogenation reactor utilized has a series of inlet points or ports spaced along the axis of flow between said first end and said second end and only one outlet point or port which is located at the second end, so that the amount of catalyst contacted when a stream is introduced at one of these inlet points can be suitably varied by selecting an appropriate inlet point. For example, when the catalyst is uniformly distributed between the first end and the second end, the maximum amount of catalyst is contacted when a stream is introduced at the first end of the reactor and passes therethrough to the outlet located at the second end of the reactor; similarly, one-half of the catalyst is contacted when a stream is introduced at a point half-way between the first end and the second end, etc. Accordingly, the amount of the catalyst that a particular fraction encounters in traversing the dehydrogenation reactor is varied by selecting the appropriate inlet point between the first end and the second end of the reactor. Moreover, since the contact time of the fraction with the catalyst varies as a function of the amount of catalyst contacted during passage through the dehydrogenation reactor and of the diluent effect of previously injected fractions, it is evident that a selection of an appropriate feed point provides a convenient means for varying contact time of the fraction with the dehydrogenation catalyst. In view of the fact that the severity level for this normal paraffin dehydrogenation reaction is a function of conversion temperature, contact time of reactants with catalyst, hydrogen partial pressure and hydrocarbon partial pressure, it can be seen that the use of different points for introducing each of the fractions produced in the fractionation step provides a convenient means for adjusting the contact time of the fraction with the catalyst, and thus the severity level that the particular fraction experiences in the dehydrogenation reactor. Although the preferred procedure for adjusting severity level within the reactor involves the variation of contact time, it is within the scope of the present invention to also vary severity level by adjusting the temperature of the various fractions being introduced into the dehydrogenation reactor. Similarly, the hydrogen partial pressure maintained at the inlet point for each of these fractions can also be adjusted by charging appropriate amounts of hydrogen with each of the fractions. A more sophisticated technique, moreover, would involve the simultaneous use of not only contact time but temperature of each of the fractions and hydrogen partial pressure at each of the inlet points to adjust severity level and the scope of the present invention includes such a procedure. However, for purposes of the present invention the preferred procedure involves the use of a relatively constant inlet temperature (after compensating for the heat of reaction) at each of the inlet points and a constant hydrogen partial pressure, with the severity level controlled exclusively by variations in contact time. It is understood that it is within the scope of the present invention to vary the shape of the catalyst bed in order to compensate for the diluent effect of previously injected fractions.

Accordingly, the present invention requires the lowest boiling fraction produced in the fractionation step to be introduced into the first end of the reactor and each of the remainder of the fractions to be introduced at a point, between the first end and the second end, selected for each fraction to produce a severity level that is inversely related to the average boiling point of the fraction. In the case where the catalyst is uniformly distributed btween the two ends of the reactor, the remainder of the fractions can be introduced into the reactor at a point selected for each fraction so that the distance, measured along the axis of flow through the reactor, between the point and the first end is directly related to the average boiling point of the fraction. For example, if the feed stream boils in the range of 200 to 500° F. and is divided into three fractions: fraction 1 boiling in the range of 200 to 300° F., fraction 2 boiling in the range of 300 to 400° F., and fraction 3 boiling in the range of 400 to 500° F., then fraction 1 is introduced into the first end of the reactor, fraction 2 is introduced at a point measured from the first end corresponding to about ⅓ the length of the reactor, and fraction 3 is introduced at a point measured from the first end corresponding to about ⅔ the length of the reactor.

The average conditions utilized in the dehydrogenation reactor, other than contact time, are preferably selected from the following ranges. The average pressure utilized is within the range of about 10 to about 100 p.s.i.g. with best results obtained in the range of about 15 to about 40 p.s.i.g. Generally, it is preferred to charge sufficient hydrogen in admixture with each of these fractions in an amount such that the ratio of moles of hydrogen to moles of hydrocarbon contained in each of these fractions is about 1:1 to about 20:1, with best results obtained when a ratio of about 5:1 to about 15:1 is used. Likewise, the temperature utilized in the dehydrogenation reactor is preferably maintained relatively constant throughout the dehydrogenation reactor. In view of the fact that the dehydrogenation reactor is endothermic, in order to maintain a relatively constant temperature it is necessary to compensate for the amount of heat consumed in the reaction. Although any suitable means of injecting this compensating heat may be used, it is generally most convenient to vary the temperature of each of the fractions introduced into the zone such that the fraction carries sufficient sensible heat to compensate at least in part for the temperature drop due to the heat of reaction. Hence, it is generally preferred to heat the fraction to a temperature which is directly related to their average boiling point prior to injecting them into the dehydrogenation reactor. The dehydrogenation reactor is accordingly maintained at a temperature of about 750° F. to about 1000° F., and more preferably in the range of about 800 to 875° F. In accordance with the present invention, the liquid hourly space velocity (LHSV), since it is proportional to the inverse of the contact time of the reactants with the catalyst, is selected for each fraction from the range of about 10 to about 100 or more hr.$^{-1}$, with the highest LHSV being assigned to the highest boiling fraction and the lowest LHSV being assigned to the lowest boiling fraction, with intermediate fractions being assigned to the lowest boiling fraction, with intermediate fractions being assigned the intermediate space velocities. In addition, in many cases, it is preferred to add a minor amount of water to the dehydrogenation reactor in amounts sufficient to maintain the amount of water entering the dehydrogenation reactor at a level corresponding to about 1000 p.p.m. to about 5000 p.p.m. or more based on the weight of the effluent stream withdrawn from the second end of the reactor.

Accordingly, the dehydrogenation reactor is maintained at conditions sufficient to produce an effluent stream from the second end of the dehydrogenation reactor containing normal mono-olefins having the same number of carbon atoms as the normal homologs present in the hydrocarbon feed stream, unreacted normal paraffin homologs and hydrogen. In addition, this effluent stream contains a minor amount of non-normal hydrocarbons such as aromatics and iso-paraffins. The hydrogen contained in this effluent stream is conveniently separated therefrom to produce a mixture of normal mono-olefins and unreacted normal paraffin homologs and at least a portion of the separated hydrogen is preferably recycled to the dehydrogenation reactor. Thereafter, the normal mono-olefins are typically recovered in a recovery step from this mixture and the unreacted normal paraffins are recycled to the fractionation step. The scope of this recovery step is intended to embrace a wide number of alternatives, particularly in regards to the means used for separating the mono-olefins from this mixture.

Suitable physical means for recovery of the normal mono-olefins involve the use of an adsorbent material having a high selectivity for the normal mono-olefin such as activated silica gel, in the particle form, activated charcoal, activated alumina, various types of molecular sieves, and other adsorbents well-known to those skilled in the art. Another physical means for performing this recovery step involves the use of an extraction solution having a high degree of selectivity for the normal mono-olefins in a liquid-liquid extraction process or in an extractive distillation process. Among the chemical means that can be used to perform this separation are those that involve the selective reaction of the mono-olefins to form a higher molecular weight product which then can be easily separated from unreacted normal paraffins by conventional fractionation means. A resume of suitable reactions for use in the recovery step is given above in conjunction with a discussion of the uses of the normal mono-olefins and is not repeated here. The preferred procedure for recovery of the normal mono-olefins involves the alkylation of an alkylatable aromatic and this procedure is explained in conjunction with the attached drawing.

Regarding the attached drawing, it is understood that it merely represents a preferred embodiment of the present invention with no intent to give details about heaters, condensers, pumps, compressors, valves, process control equipment and other conventional components except where a knowledge of these devices is essential to the understanding of the present invention or would not be self-evident to one skilled in the art. Moreover, the following discussion of the attached drawing is given with reference to a particular feed stream in order to provide a specific example of the benefits which are derived from the present invention.

Referring now to the drawing, a hydrocarbon feed stream enters the process through line 1. In this particular case, the stream contains essentially 4 normal paraffin homologs boiling in the $C_{11}$ to $C_{14}$ range. Specifically, the feed stream contains 26.4 wt. percent n-$C_{11}$, 31.2 wt. percent n-$C_{12}$, 25.3 wt. percent n-$C_{13}$, and 13.3 wt. percent n-$C_{14}$, with about 3.1 wt. percent non-normal components and trace amounts of n-$C_{10}$ and n-$C_{15}$. Moreover, its initial boiling point is about 354° F., its 50% point 413° F., and its end boiling point 459° F. Just prior to entrance of this hydrocarbon stream into fractionator 2, at the junction of line 1 with line 12, it is commingled with a normal paraffin-containing recycle stream, the source of which will be hereinafter explained. The resultant mixture is then charged to fractionator 2 which is a conventional fractionation means designed to separate the influent stream into a $C_{11}$ to $C_{12}$ cut which is taken overhead and a $C_{13}$ to $C_{14}$ cut which is recovered as bottoms. In this case, the cut point is about 410° F. Accordingly, the flow scheme illustrated in the drawing is an example of a case where a 4 homolog-containing feed stream is separated in to 2 fractions each of which contain substantial amounts of 2 adjacent normal paraffin homologs.

Following the fractionation step, the overhead stream from the fractionator is withdrawn via line 15, commingled with hydrogen at the junction of line 15 with line 14 in an amount sufficient to provide about 8.0 moles of hydrogen per mole of hydrocarbon flowing therethrough. The resulting mixture is passed via line 15 into heater 16 wherein the mixture is heated to a temperature of about 860° F. and the heated mixture is passed via line 17 into the top of dehydrogenation reactor 6.

Dehydrogenation reactor 6 consists of a cylindrically shaped vessel having a top or first end and a bottom or second end, and containing a fixed bed of 1/16 inch spherical particles of a dehydrogenation catalyst containing, on an elemental basis, about 0.75 wt. percent platinum, about 0.5 wt. percent lithium, and 0.05 wt. percent arsenic, all combined with an alumina carrier material. The catalyst is prepared according to the method given in U.S. Patent No. 3,291,755. The catalyst is maintained within dehydrogenation reactor 6 as a fixed bed uniformly distributed between the ends of the reactors. The flow in dehydrogenation reactor 6 is downflow and the heated mixture from heater 16 is passed into an inlet port at the top end of reactor 6.

Returning to the bottom stream from fractionator 2 it is withdrawn via line 3 commingled with about 8 moles of hydrogen per mole of hydrocarbon at the junction of line 13 with line 3 and passed into heater 4. The resulting mixture in heater 4 is raised to a temperature of about 865° F. and thereafter passed via line 5 into dehydrogenation reactor 6. The point of entry of the bottoms fraction withdrawn from fractionator 2 into the dehydrogenation reactor is, in accordance with the concept of the present invention, selected so that the severity level experienced by this fraction in the reactor is substantially less than for the lower boiling fraction introduced via line 17. Since the dehydrogenation catalyst is uniformly distributed along the axis of flow (i.e. from top to bottom) in dehydrogenation reactor 6, the point of entry is chosen to be about half-way between the first end or top end and the second end or bottom end of reactor 6, thereby setting the contact time experienced by the higher boiling fraction at a value substantially less than the contact time experienced by the lower boiling fraction entering via line 17.

Dehydrogenation reactor 6 is operated at the following conditions: an outlet pressure of 30 p.s.i.g., a LHSV based on the lower boiling fraction entering via line 17 of about 32 hr.$^{-1}$ and a LHSV based exclusively on the higher boiling fraction of about 64 hr.$^{-1}$, a hydrogen to hydrocarbon mole ratio of about 8:1 and a conversion temperature of approximately 860° F.

An effluent stream is then withdrawn from the bottom or second end of reactor 6 via line 7, cooled to a temperature of about 100° F., by a cooling means not shown, and passed into separating zone 8. An analysis of this effluent stream from reactor 6 shows that it contains normal mono-olefins in the $C_{11}$ through $C_{14}$ range, unreacted normal paraffins in the $C_{11}$ through $C_{14}$ range, and hydrogen. In addition, this effluent stream contains a minor amount, about 5 wt. percent, of non-normal hydrocarbons which are principally alkylbenzenes, isoparaffins, in the $C_{11}$ to $C_{14}$ range, napthenes and hydrocarbons boiling below $C_{11}$. In separating zone 8, a hydrogen-rich vapor phase separates from a hydrocarbon-rich liquid phase. The hydrogen-rich vapor is withdrawn via line 13 and a portion of the withdrawn hydrogen stream is passed back to the dehydrogenation reactor through compressive means not shown. Another portion of the withdrawn hydrogen stream is vented from the system via line 18 in order to maintain pressure control. The hydrocarbon-rich phase formed in separating zone 8 is withdrawn via line 9 and passed to a mono-olefin recovery system 10.

The function of mono-olefin recovery system 10 is to separate mono-olefins from unreacted normal paraffins. In this example, the separation is performed using an alkylation reaction to form an arylalkane from the normal mono-olefins via techniques that are well-known to those skilled in the art. The arylalkane is then separated from the unreacted normal paraffin by a suitable fractionation step. Accordingly, an arylalkane leaves the mono-olefin recovery system 10 via line 11 and unreacted normal paraffins are withdrawn from this system via line 12 and recycled back to fractionator 2.

In this case, the alkylation step involves commingling a stream containing benzene, with the stream entering mono-olefin recovery zone 10 via line 9, in an amount sufficient to provide about 12 moles of benezene per mole of normal mono-olefin introduced via line 9. The resulting mixture of normal mono-olefins, normal paraffins and benzene is then commingled with a stream containing substantially anhydrous hydrogen fluoride in an amount sufficient to provide about 0.5 to 2 volumes of hydrogen fluoride solution per volume of the hydrocarbon mixture. The alkylation step is performed at a temperature of about 70 to 150° F., a pressure sufficient to maintain the reactants in liquid phase, and a contact time of about 5 to 30 minutes. Thereafter, the hydrogen fluoride solution is separated from the hydrocarbon product from the alkylation step and this hydrocarbon product is passed to a suitable train of fractionators designed to separate the product from the alkylation step into an unreacted benzene-rich fraction, an unreacted normal paraffin-rich fraction, and a phenyl-substituted normal paraffin-containing fraction. Typically, the unreacted benzene-rich fraction is recycled to the alkylation step, and the unreacted normal paraffn-rich fraction is recycled via line 12. The phenyl-substituted normal paraffin-containing fraction is recovered as product via line 11. It is, of course, understood that the details associated with the mono-olefin recovery system are not essential to the understanding of the present invention.

Operation of this process is continued as outlined above for a catalyst life equivalent to about 100 barrels of the hydrocarbon feed stream processed per pound of the dehydrogenation catalyst utilized in dehydrogenation reactor 6, and throughout this period the average conversion temperature utilized in dehydrogenation reactor 6 is continuously adjusted in order to maintain an over-all conversion level based on disappearance of normal paraffins from the total hydrocarbon feed to about 10 wt. percent. The average deactivation rate for the catalyst employed in dehydrogenation reactor 6 is computed as a function of the rate at which the average conversion temperature utilized therein is raised in order to compensate for the deposition of hydrocarbonaceous materials on the catalyst, and it is found that the dehydrogenation catalyst deactivated at an average rate of about 0.05° F. per barrel of total charge to dehydrogenation reactor 6 per pound of catalyst contained in the reactor. In addition, an analysis of the phenyl-alkane recovered via line 11 indicates the average selectivity of the process for $C_{11}$ to $C_{14}$ normal mono-olefins is about 90%. These results stand in sharp contract with the results obtained when the hydrocarbon feed stream, entering the process via line 1, is charged directly to dehydrogenation reactor 6, without being fractionated into separate cuts and without using a split feed system. In this latter case, when the temperature within dehydrogenation reactor 6 is continuously adjusted to maintain a 10 wt. percent conversion based on disappearance of normal paraffins in the hydrocarbon feed stream, the catalyst is found to deactivate at a rate of about 0.5° F. per barrel of charge per pound of catalyst contained in reactor 6, and the average over-all selectivity is about 80%. Accordingly, the advantages of the present invention are manifest.

I claim as my invention:

1. A process for selectively dehydrogenating a hydrocarbon stream containing at least 4 normal paraffin homologs, each of which has at least 6 carbon atoms, which process uses a single dehydrogenation reactor containing a dehydrogenation catalyst, and having a first end and a second end, said process comprising the steps of:
   (a) fractionating said hydrocarbon stream into a plurality of fractions of different boiling point range, each of which fractions contains a substantial amount of at least one normal paraffin homolog;
   (b) introducing the lowest boiling fraction produced by step (a) and hydrogen into the first end of the dehydrogenation reactor;
   (c) introducing each of the remainder of the fractions produced in step (a) and hydrogen into the dehydrogenation reactor at a point between said first end and said second end selected for each fraction to produce a severity level for the fraction that is inversely related to the average boiling point thereof;
   (d) maintaining said dehydrogenation reactor at conditions sufficient to convert normal paraffins to normal mono-olefins; and
   (e) withdrawing from said second end of said dehydrogenation reactor, an effluent stream containing normal mono-olefins having the same number of carbon atoms as said normal paraffin homologs, unreacted normal paraffin homologs and hydrogen.

2. The process of claim 1 wherein the dehydrogenation catalyst comprises a platinum group component and an alkali component combined with an alumina carrier material.

3. The process of claim 2 wherein said dehydrogenation catalyst contains a component selected from the group consisting of arsenic, antimony, bismuth, sulfur, selenium, tellurium, and compounds thereof.

4. The process of claim 3 wherein said catalyst is a composite of alumina, about 0.01 to about 1.5 wt. percent lithium, about 0.05 to about 5.0 wt. percent platinum, and arsenic in an amount of about 0.1 to about 0.8 atoms of arsenic per atom of platinum.

5. The process of claim 1 wherein said hydrocarbon stream contains normal paraffin hydrocarbons boiling in the $C_{11}$ to $C_{14}$ range and said fractionation step is operated to produce a first fraction containing $C_{11}$ and $C_{12}$ hydrocarbons and a second fraction containing $C_{13}$ and $C_{14}$ hydrocarbons.

6. The process of claim 1 wherein a hydrogen stream is separated from the effluent stream withdrawn in step (e) to obtain a mixture of normal mono-olefins and unreacted normal paraffin homologs, and at least a portion of the resulting hydrogen stream is recycled to the dehydrogenation reactor.

7. The process of claim 6 wherein the reacted normal paraffin homologs are recovered from said mixture and recycled to step (a).

8. The process of claim 7 wherein the unreacted normal paraffin homologs are recovered by subjecting said mixture to an alkylation step followed by a fractionation step.

9. The process of claim 1 wherein the conditions utilized in step (d) include a pressure of about 10 to about 100 p.s.i.g., a hydrogen to hydrocarbon mole ratio of about 1:1 to about 20:1, and a temperature of about 750° F. to about 1000° F.

References Cited

UNITED STATES PATENTS

| | | | |
|---|---|---|---|
| 2,878,179 | 3/1959 | Hennig | 208—144 |
| 3,002,916 | 10/1961 | Hamilton | 208—93 |
| 3,047,490 | 7/1962 | Myers | 208—141 |
| 3,072,561 | 1/1963 | Cahn | 208—80 |
| 3,072,562 | 1/1963 | Bowles | 208—93 |
| 3,124,523 | 3/1964 | Scott | 208—95 |
| 3,126,426 | 3/1964 | Turnquest et al. | 260—683.3 |
| 3,168,587 | 2/1965 | Michaels et al. | 260—683.3 |
| 3,293,319 | 12/1966 | Haensel et al. | 260—683.3 |
| 3,360,586 | 12/1967 | Bloch et al. | 260—683.3 |

DELBERT E. GANTZ, Primary Examiner

G. E. SCHMITKONS, Assistant Examiner

U.S. Cl. X.R.

208—80, 92, 93; 260—671